United States Patent [19]

Jordan et al.

[11] 4,406,925
[45] Sep. 27, 1983

[54] MESSAGE DELIVERY SYSTEM

[75] Inventors: Royce D. Jordan, Duluth; Edgar L. O'Neal, Tucker, both of Ga.

[73] Assignee: The Audichron Company, Atlanta, Ga.

[21] Appl. No.: 295,722

[22] Filed: Aug. 24, 1981

[51] Int. Cl.³ .......................................... H04M 3/42
[52] U.S. Cl. .................................. 179/18 B; 179/5 P; 179/6.02; 179/90 BD
[58] Field of Search ................ 179/6.02, 18 B, 84 C, 179/5 P, 18 ES, 90 B, 90 BD

[56] References Cited

U.S. PATENT DOCUMENTS

| 3,733,440 | 5/1973 | Sipes | 179/18 B |
| 4,072,825 | 2/1978 | McLay et al. | 179/18 B |
| 4,188,510 | 2/1980 | Bower et al. | 179/90 BD |
| 4,356,348 | 10/1982 | Smith | 179/1 MN |

Primary Examiner—Thomas W. Brown
Attorney, Agent, or Firm—Jones & Askew

[57] ABSTRACT

An automatic extension calling apparatus for delivering a prerecorded message (18) to a plurality of predetermined extensions at predetermined times of day. The apparatus is connected to a plurality of PBX trunks (15) via a plurality of interface circuits (16) which connect automatic calling units (30) through concentrators (26) to the PBX trunks. A selective input and display apparatus (41) provides data to a microcomputer (37) for storing (139) signals corresponding to the extension to be called and the time of day at which the call is to be placed. Apparatus is disclosed for distributing a plurality of calls, designated for the same time of day, evenly about this time of day, and means for automatically generating a second stored signal for a second attempt in response to failure of the initial call to be answered are also shown.

6 Claims, 8 Drawing Figures

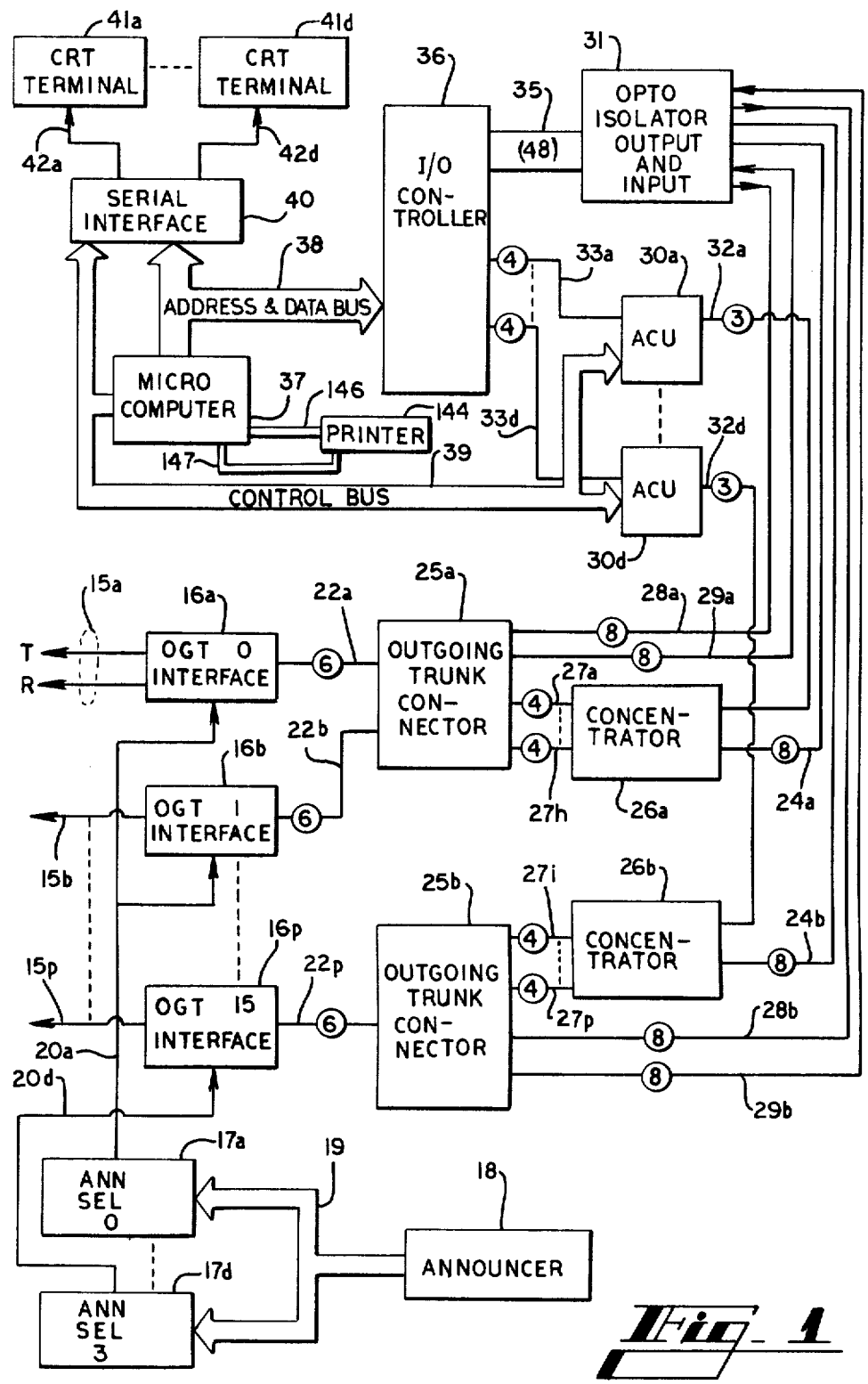

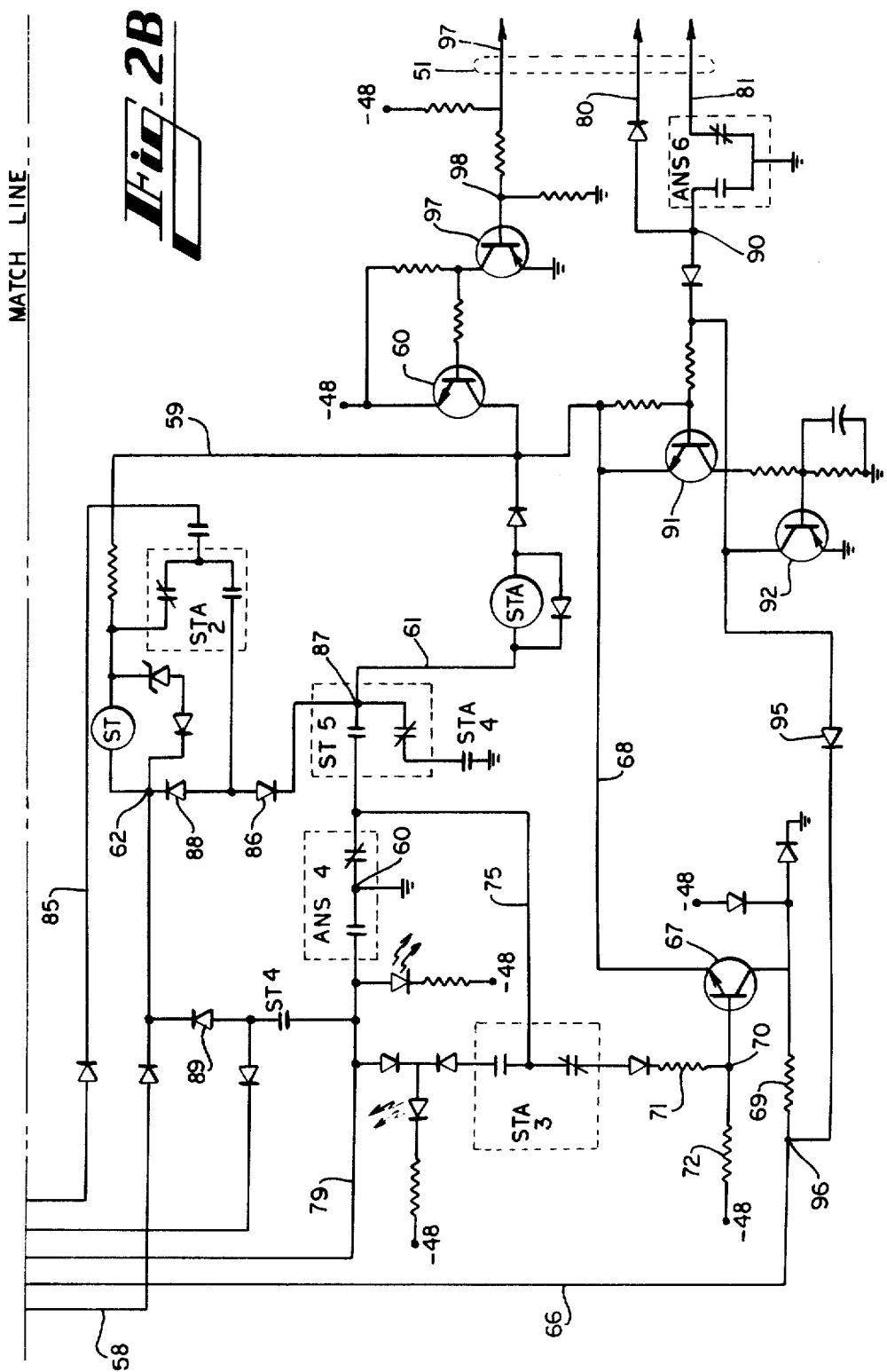

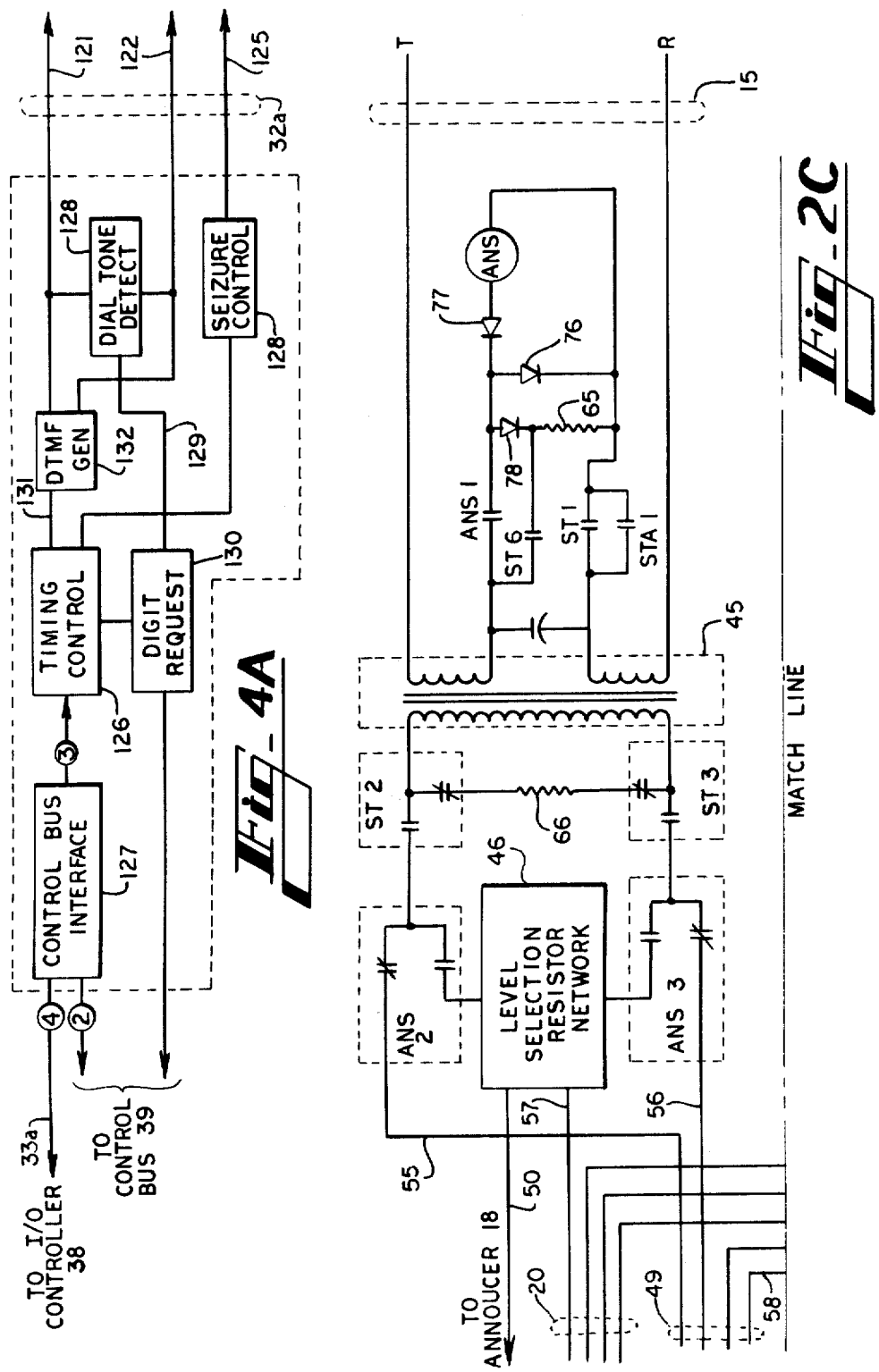

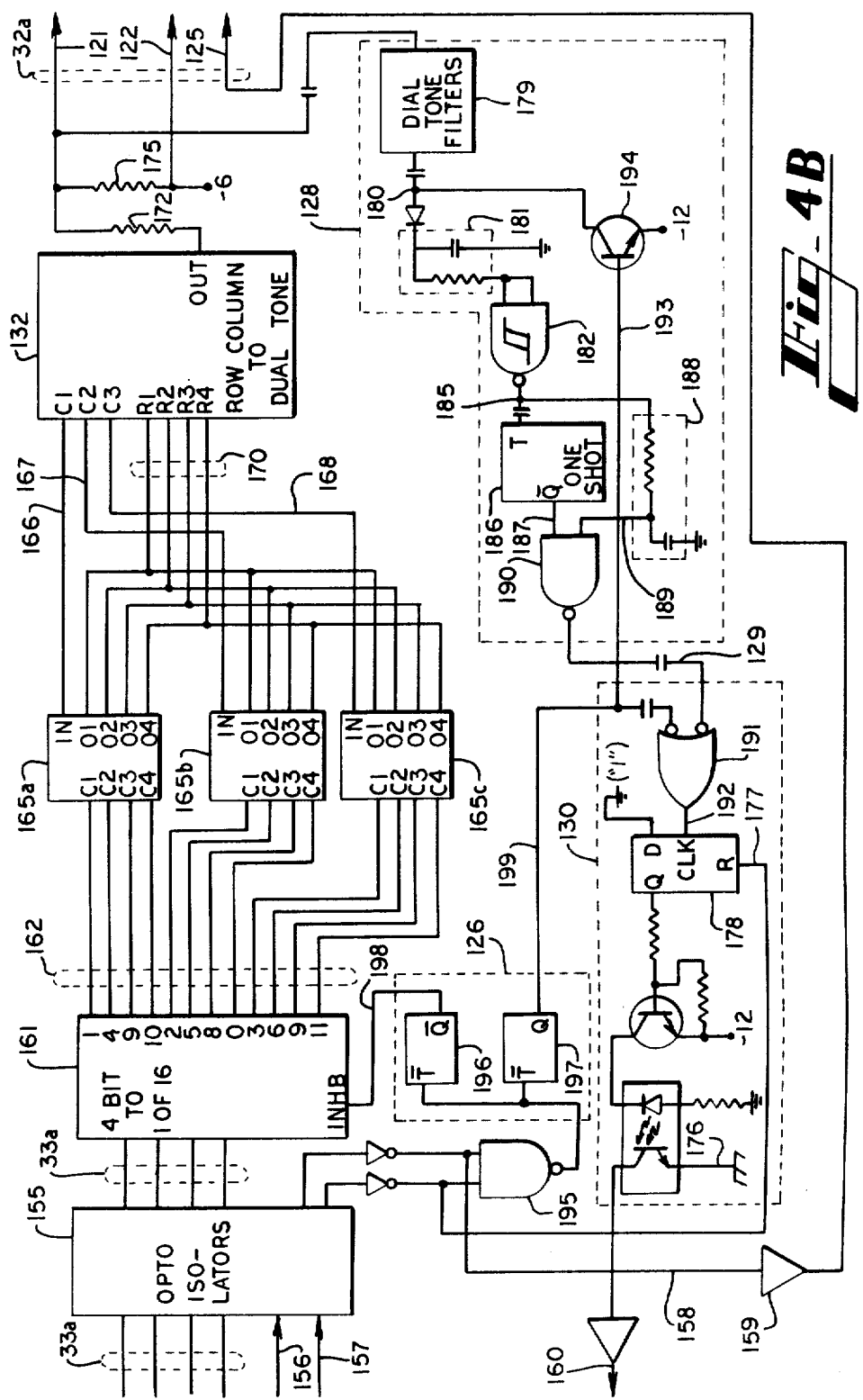

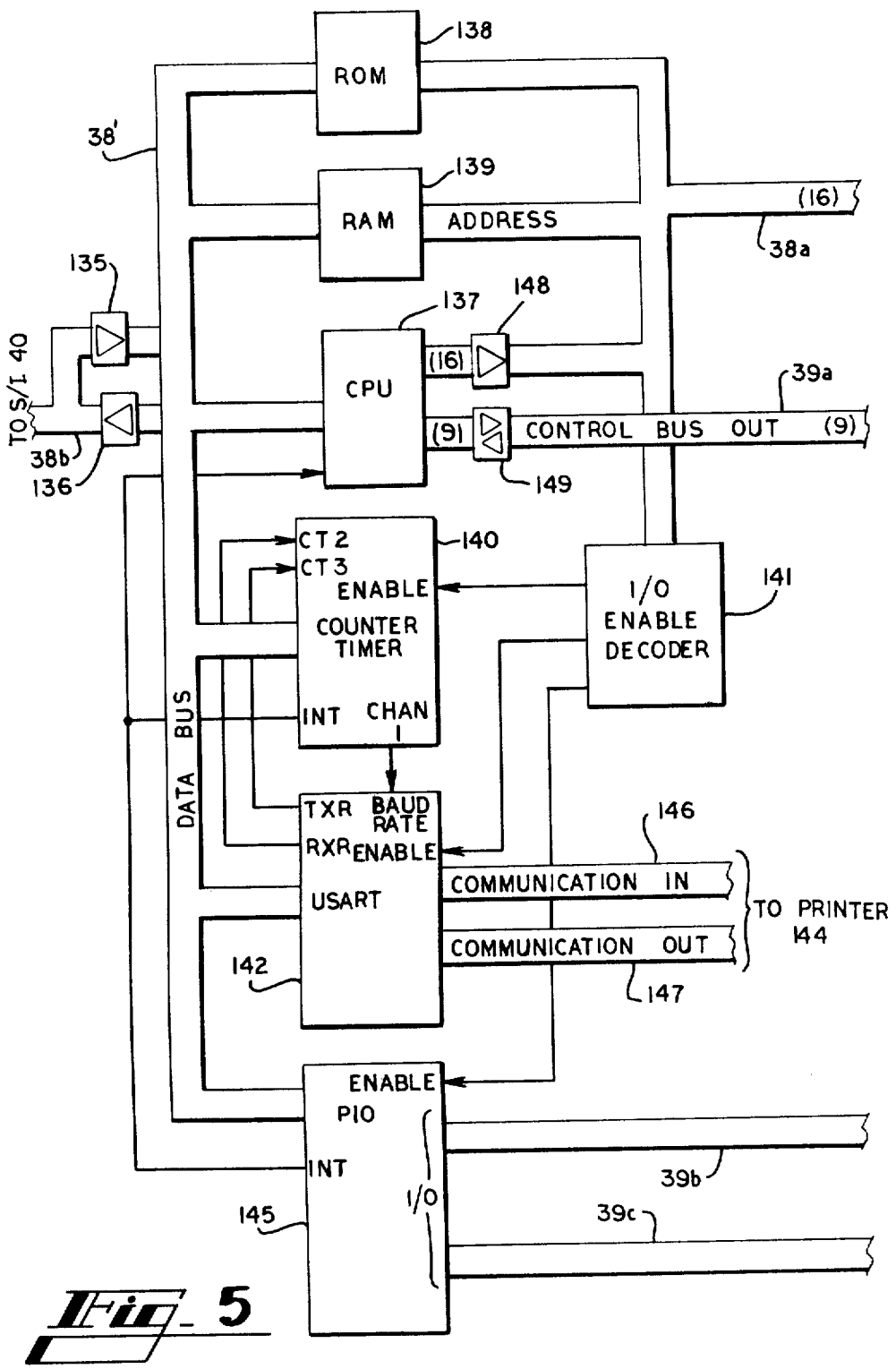

4,406,925

MESSAGE DELIVERY SYSTEM

TECHNICAL FIELD

The present invention relates to systems for automatically delivering messages over telephone lines and is particularly related to the field of providing predetermined messages at predetermined times to selected subscriber sets of a private branch exchange.

BACKGROUND OF THE INVENTION

While the present invention is generally in the field of timed automatic delivery of predetermined messages over a telephone system, it is particularly suited to the environment of a large private branch exchange requiring timed delivery of repetitious messages to selected subscriber lines on the exchange. Thus, it is particularly suited to the environment of hotels and motels for delivering a message commonly referred to as a "wake-up call", for delivering information as to services available within the hotel, and for providing emergency messages.

For many years, a custom of operators of hotel and motel establishments has been to provide a service for waking up customers in particular rooms at a particular time of day. Since the advent of the telephone, this is commonly done by calling the room of the quest at a predetermined time selected by the quest some time before retiring to bed. It is customary to keep a manual or computerized log of which rooms are to be called at what time of day in order to provide the wake-up service. Experience has shown that requests for wake-up calls tend to be clustered around certain times of the morning and a high volume of wake-up calls must be provided by the hotel staff.

More recently, automated and semi-automated provision of predetermined messages for wake-up calls have been provided. However, previous systems have not adequately taken into account the problem of traffic load for wake-up calls clustered around particular times of day. This tends to make a significant portion of the calls at a heavy traffic time late in arriving at the guest's room.

Also, it is desirable once an automatic calling system is provided to provide a heretofore unknown block calling procedure wherein a particular message may be delivered sequentially to a plurality of PBX lines (rooms) for, example, indicating that a certain activity is being provided within the hotel or that a fire is in progress.

The former example is quite useful when a particular group of people, such as attendees at a convention, are booked into a block of rooms and wish to be notified when certain meetings, etc. pertinent to their convention are taking place. The latter example is, of course, one example of delivery of an emergency message to occupants of a room most likely to be affected by an emergency situation. For example, if a fire alarm has been activated in a particular wing of a hotel, it may be desirable to enter a short sequence of instructions indicating that certain blocks of rooms should be called with a message indicating that that portion of the hotel is to be evacuated.

SUMMARY OF THE INVENTION

The present invention overcomes the shortcomings of the prior art by providing an automatic calling system for a private branch exchange in which the actual time of occurrence of a plurality of calls scheduled to occur at the same time will be distributed evenly about the scheduled time of occurrence.

It is a further object of the present invention to provide an automatic calling system for a plurality of lines in a private branch exchange which will automatically provide a recorded message to all subscriber lines having numbers falling between two pre-selected subscriber line numbers.

It is a further object of the present invention to provide an automatic calling arrangement which will repeat attempts to complete a call to a particular room at predetermined time intervals after the first attempt which is unsuccessful, until calling is completed or a message is provided at a control location indicating that the predetermined number of attempts have all been unsuccessful.

That the present invention accomplishes the foregoing objects as well as providing additional benefits over the prior art will become apparent from the detailed description to follow.

BRIEF DESCRIPTION OF THE DRAWINGS

FIG. 1 is a block diagram of the preferred embodiment of the present invention.

FIGS. 2B and 2C are a schematic diagram of the outgoing trunk circuit shown in FIG. 2A.

FIG. 4A is a block diagram of the preferred embodiment of the automatic calling unit of the present invention.

FIG. 4B is a schematic diagram of the automatic calling unit shown in FIG. 4A.

FIG. 5 is a diagram of the microcomputer circuit of the preferred embodiment.

DETAILED DESCRIPTION

Figure 2A:
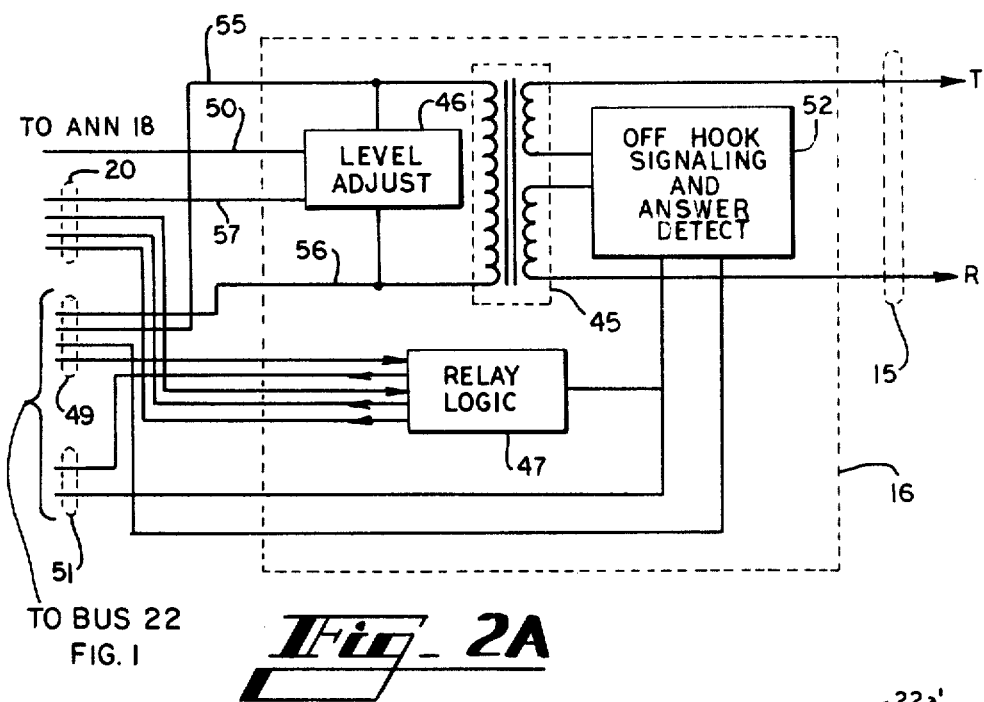
FIG. 2A is a block diagram of the outgoing trunk circuit for interfacing the present invention to a PBX trunk.

The preferred embodiment of the present invention is shown in the drawings in which like numerals reference like parts. Turning first to FIG. 1, it may be seen that the present invention is designed to provide announcements to a plurality of private branch exchange trunks 15a–15p. It will thus be appreciated that the preferred embodiment is arranged for connection to up to sixteen trunks. As shown at trunk 15a, each trunk comprises a conventional tip-ring pair. Each of trunks 15 is interfaced with the present invention via an outgoing trunk interface circuit (OGT interface) 16.

In the preferred embodiment, announcer 18 is a four-phase automatic annunciator, each phase of which is connected to one of announcement selectors 17a–17d. Multidrop connection 20a–20d each connect one of announcement selectors 17 to one of four of outgoing trunk interface circuits 16. A pair of outgoing trunk connector blocks 25a and 25b provide a six line bus 22 to each of outgoing trunk interface circuits 16.

Concentrators 26 are connected to automatic call units 30a–30d via three-line buses 32a–32d. Optoisolator block 31 is used to interface the remainder of the circuitry on the upper part of FIG. 1 to the PBX side of the preferred embodiment shown on FIG. 1. A parallel input/output controller 36 provides a forty-eight line bus 35 through optoisolator block 31 to both concentrators 26 and outgoing trunk connector blocks 25. Parallel I/O controller 36 also provides sixteen lines in the form of four four-line buses 32a-32d, one each of which is provided to one of automatic call units 30. A microcomputer 37 controls operation of the preferred embodiment through an address and data bus 38 and control bus 39. Address and data bus 38 is connected directly to parallel I/O controller 36 which in turn provides address and data information on buses 32 to automatic calling units 30. A tap to control bus 39 is provided directly to automatic call units 30.

Buses 38 and 39 are also connected to a conventional serial interface 40 which connects microcomputer 37 to a plurality of CRT and keyboard terminals 41a-41d over serial data links 42a-42d. A pair of buses 146 and 147 connect computer 37 to an audit trail printer 144.

Basically, the operation of the preferred embodiment is as follows. Microcomputer 37 receives information as to the status of each of trunks 15 connected to outgoing trunk interface circuits 16 through connector blocks 25 and optoisolator block 31. I/O controller 36 also controls operation of automatic call unit 30, all in response to commands from microcomputer 37. Concentrators 26a and 26b are substantially conventional concentrators for controlling the connection of the sixteen trunks 15a-15p to four automatic call units 30a-30d.

When microcomputer 37 determines that a particular room should receive a predetermined message, such as a wake-up call, it provides an instruction to I/O controller 36 to obtain an available one of trunks 15. Signals on bus 35 are passed to concentrators 26 which scan the trunks for an available line.

When one of concentrators 26 indicates that an available line has been found, the information passes back through I/O controller 36 to microcomputer 37 which generates appropriate signals on control bus 39 and on address and data bus 38 to one of ACUs 30 to commence to the automatic dialing sequence.

Once the dialing sequence is completed, microcomputer 37 will ignore the particular one of outgoing trunk circuits 16 unless and until a counter/timer arrangement of microcomputer 37 detects that the call is not answered within a predetermined period of time.

In the event the called party answers, outgoing trunk circuit 16 provides a supervisory signal, indicating that the line has been answered, to one of announcement selectors 17 which selects the next beginning announcement phase from four-phase announcer 18. The particular announcement selector then cuts through the phase of the announcement to the particular one of outgoing trunk interface circuits 16 connecting the call and ultimately to trunk 15.

If the call is not completed, a flag is set in the memory of microcomputer 37 which will cause the call to be initiated a second time a predetermined amount of time later.

Turning next to FIG. 2A, an expanded block diagram of a typical one of outgoing trunk interface circuit 16 is shown. PBX trunk 15 is coupled through a split secondary winding of transformer 45 to off-hook signaling and answer detection apparatus 52. Apparatus 52 is coupled to relay logic 47 which generates and accepts internal supervisory signals for the preferred embodiment.

The primary of transformer 45, comprising lines 55 and 56, extends through bus 49 to concentrator 26 (FIG. 1). It should be understood that these lines pass through the outgoing trunk connector block 25 shown in FIG. 1 and comprise a portion of buses 22 and 27 shown in FIG. 1.

Lines 55 and 56 are shunted by level adjusting network 46, one input of which comprises a portion of bus 20, to the particular one of announcement selectors 17 associated with the trunk shown. The other lead to level adjust network 46 is line 50 which goes directly to announcer 18 carrying the announcement to be delivered out over trunk 15. It should be understood that level adjust network 46 is preferably embodied by an array of resistors with jumper selectable interconnections for controlling the output level of the announcement which appears on trunk 15. The other line from level adjust network 57, which comprises a portion of bus 20, is connected to announcement selector 17, and thus announcement selector 17 controls the cut-in of the signal from announcer 18 which appears on line 50 and 57 to be coupled onto trunk 15.

Lines 51 are provided through bus 22, OGT connector 25, and bus 29 (FIG. 1), to optoisolator output and input connector block 31 for signaling the status of outgoing trunk interface circuit 16 to I/O controller 36.

Turning next to FIGS. 2B and 2C, a schematic diagram of outgoing trunk interface circuit 16 may be seen. It should be understood that the coils of three relays have been shown as ANS, ST, STA. Various relay contacts operated by these coils are identified as a prefix corresponding to the coil, followed by a dash and a number of the contact or contact set.

In order to understand operation of the outgoing trunk interface circuit, the normal connect sequence will be described. The sequence begins with one of concentrators 26 (FIG. 1) selecting the particular outgoing trunk circut shown in FIGS. 2B and 2C. The selection is made by the concentrator by grounding line 58 which grounds point 62, which completes a path through coil ST along line 59 through transistor 60 to the −48 volt power supply, thus operating coil ST.

A pair of contacts ST-1 and ST-6, which comprise a portion of off-hook signaling and answer detect apparatus 52, are closed to shunt trunk 15 with resistance 65, which is interpreted by the PBX (not shown) as a request for dial tone. Thus, it will be appreciated that the preferred embodiment of the outgoing trunk interface circuit is arranged to be connected to loop start PBX trunks of which trunk 15 is an example. It should be further understood, as will become apparent from the description below, that the preferred embodiment of the outgoing trunk interface circuit is further designed to be used with PBX trunks which provide reverse battery answer supervision. Given the disclosure of the preferred embodiment for use with loop start, reverse battery answer supervision trunks, other embodiments of the present invention for use with trunks characterized by different types of supervisory signals will be suggested to those skilled in the art.

The excitation of coil ST also operates contacts ST-2 and ST-3 which removes the load represented by resistors 66 from the primary side of transformer 45 and connects the primary through the normally-closed contacts of contact sets ANS-2 and ANS-3 to lines 55 and 56.

Furthermore, it may be seen that prior to operation of coil STA, line 66 carried a resistive battery signal condition through resistor 69 and transistor 67 through line 68 to negative battery through transistor 60. This is due to the fact that the base of transistor 67 is biased at point 70 by resistors 71 and 72 when contact set STA-3 is in its normal position, since the common point of this contact set is grounded through line 75. When contact set STA-3 operates, line 75 is disconnected from point 70, leaving the base of transistor 67 at the negative battery potential, cutting off the transistor and thus removing the resistive battery condition from line 66. The removal of resistive battery from line 66 signals the concentrator (along bus 58) that this particular trunk has been seized and is busy.

Lines 55 and 56 are connected along bus 49 to one of concentrators 26 (FIG. 1), which in turn connects these leads to one of automatic call units 30 (FIG. 1). As will be described in further detail hereinbelow, it is automatic call unit 30 which waits until a dial tone provided by the PBX is detected on trunk 15.

When a dial tone has been detected by automatic call unit 30 (FIG. 1), dual tone dialing signals (DTMF) are provided over lines 55 and 56 which are coupled through transformer 40 to PBX trunk 15. In the example shown, trunks 15 are considered to be responsive to conventional DTMF dialing signals but it should also be understood that embodiments of the present invention for use with PBXs which require dial pulses will readily suggest themselves to those skilled in the art.

Once the dialing sequence has been completed, microcomputer 37 ignores the signaling at the outgoing trunk interface circuit of FIG. 2B except to the extent that it periodically scans to detect a condition of no answer of the line within a predetermined period of time. If the line is answered and normal connection to announcer 18 is effected, the processor embodied by microcomputer 37 will not pay attention to the trunk interface circuit unless there is a requirement for disconnect.

As noted hereinabove, the preferred embodiment contemplates that trunk 15 will be a reverse battery answer supervision trunk. Thus, when the called party answers, the polarity of the tip and ring conductors of trunk 15 will be reversed. This condition back biases diode 76 and forward biases diodes 77 and 78, thus completing a path from the ring conductor of trunk 15 through the ANS coil contact ST-6 (which will be closed) on to the top conductor, thus operating the ANS (answer) relay.

Operation of the answer relay closes contact ANS-1, thus latching on the answer relay so long as the reverse polarity of trunk 15 is maintained and either of contacts STA-1 or ST-1 remains closed. Therefore the answer relay will not drop off until the called party hangs up, removing the reverse battery supervision, or the STA and St relay drop out as noted hereinbelow.

Operation of the ANS coil also operates contact sets ANS-2 and ANS-3, removing line 55 and 56 from connection to the primary side of transformer 45 and connecting this side of the transformer to level selection resistor network 46, thus completing an audio path between lines 50 and 57 to transformer 45.

The operation of contacts set ANS-4 extends the ground from point 60 to line 79 which extends along bus 20 to one of announcement selectors 17 (FIG. 1), which is thus conditioned to cut through on the next available beginning phase of an announcement from announcer 18 (FIG. 1).

Operation of contact set ANS-6 removes ground from line 81 and grounds line 80 (of bus 51), and thus provides a signal to the processor that the particular call has been answered and there is no further need to continue counting to detect a no-answer condition.

When the concentrator removes the ground from line 58, ST relay drops off and coil STA remains latched through its own contact STA-4 and the normally-closed contact of contact set ST-5 which provides a ground along line 61 through coil STA to the negative battery through transistor 60. The dropping off of the ST relay re-establishes the loading of the primary of transformer 45 by resistor 66 and this condition is maintained until a signal is received on line 85 from the announcement selector that a cut-through is to be made, providing the beginning of an announcement. The aforementioned signal of line 85, which provides a ground condition through contacts ANS-5, STA-2, diode 88 to point 62 and thus through coil ST onto the negative battery on line 59. This again operates the ST coil, causing all three relays to be operated. Under these conditions the ST coil remains latched through contacts ANS-4 and ST-4, which may be seen to provide a path from the ground at point 60 through diode 89 to point 62, through the ST coil and onto the negative battery on line 59. These conditions remain so long as the announcement selectors provide a ground condition on line 85, which it will do during delivery of the announcement.

When the announcement is complete, one of announcement selectors 17 (FIG. 1) removes the ground from line 85 which causes the STA coil to drop off. This causes contact set STA-3 to assume its normal configuration and conditions line 66 to provide a resistive battery condition to the concentrator as soon as the answer relay is released, removing the ground provided at point 90 through transistors 91 and 92, and diode 95 to point 96.

Thus, the concentrator may sequence a restart as soon as the aforementioned removal of ground from line 85 is provided by the announcement selector in the event the called party has hung up prior to completion of the announcement. In the case where the called party stays on the line until after completion of the announcement, point 96 will remain grounded, signaling that the particular trunk 15 is still in its busy condition until the announcement selector provides a second short grounding pulse on line 85 which causes a complete reset.

If it is assumed for the moment that the called party has maintained trunk 15 in its answered condition, the aforementioned short ground pulse on line 85 causes the ST relay to drop off, since the STA relay has previously dropped off. Because of this, the ground condition on line 85 is connected through contacts ANS-5 and normally-closed contact of set STA-2, which provides ground to both sides of the ST coil since a ground condition is present at point 62.

Thus, the last grounding of line 85 will cause the ST relay to drop off and therefore both relays ST and STA will be deactivated. When this occurs, it may be seen that both contacts ST-1 and STA-1 are open and thus the loop in trunk 15 is open, deenergizing the ANS coil, causing the answer relay to drop off and disconnecting the trunk. When the answer relay drops off, point 90 is returned to its open circuit condition, transistors 91 and 92 are cut off and the resistive battery condition is reestablished on line 66, indicating to the concentrator that this particular trunk is again available to place another call.

Note that if conditions require at any time, the entire arrangement may be disconnected by the grounding of line 97. Grounding of line 97 grounds point 98, cutting off transistor 99 and thus causing the base of transistor 60 to be taken to the same potential as the emitter of transistor 60. The cutting off of transistor 60 terminates the current path to negative battery for both the ST and STA coils and, when these drop off, the current path to the ANS coil is terminated causing it to drop off. Thus the outgoing trunk interface circuit of the present invention may disconnect both sides (announcer and PBX trunk) in the event conditions require by the grounding from the processor of line 97.

Figure 3:
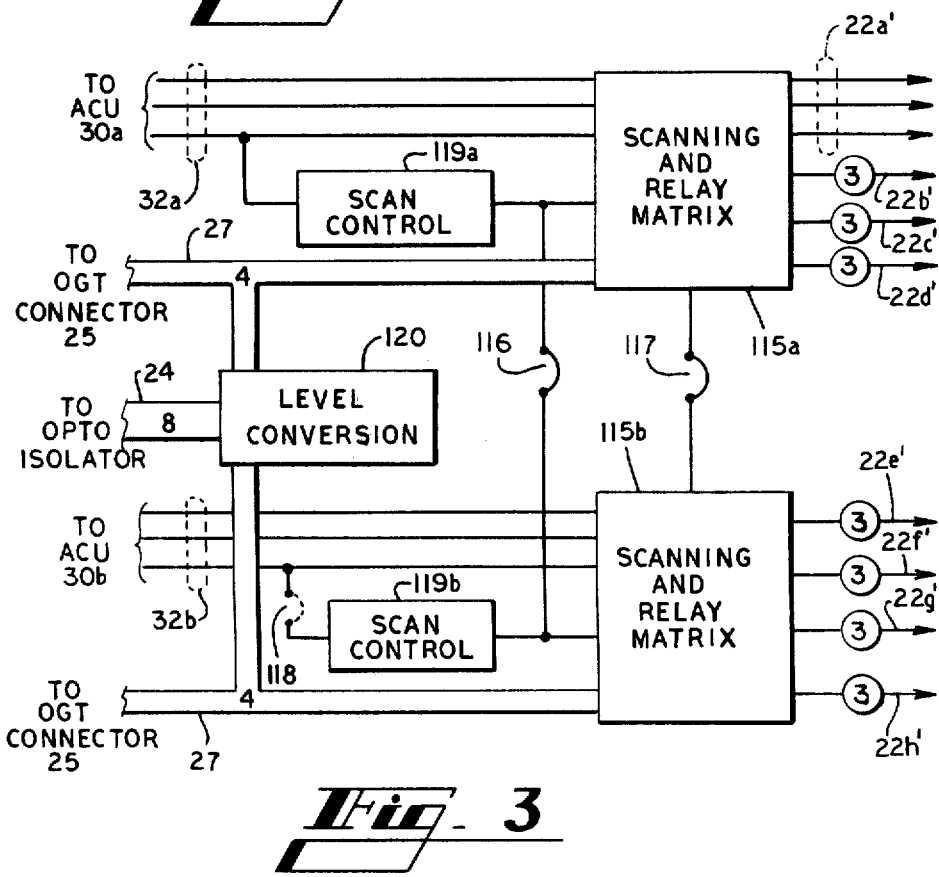
FIG. 3 is a block diagram of the concentrator of the preferred embodiment.

Turning next to FIG. 3, a block diagram of the concentrator of the preferred embodiment may be seen. Each concentrator includes a pair of scanning and relay matrices 115a and 115b, the nature of which will be appreciated by those skilled in the art. Each of matrices 115 is designed to service four trunks. The lines exiting the righthand side of FIG. 3 should be understood to correspond to a portion of six line buses 22a, 22b shown in FIG. 1 connecting outgoing trunk connector block 25a to the outgoing trunk interface circuits 16. Thus on FIG. 3, the three line connections are labeled 22a'-22h'. It should be understood that these lines pass through outgoing trunk connector blocks 25 onto outgoing trunk interface circuit 16.

The 22a' output lines from scanning and relay matrix 115a have been broken down to show their correspondence to three lines shown in detail on FIG. 2B, and thus lines 55', 56' and 58' are shown as brought out of 115a. Thus it may be seen that the output of each scanning and relay matrix include the conductors corresponding to tip and ring connections to the concentrator (55 and 56 on FIG. 2B) and line 58, which is used to initially seize each trunk by activating the ST coil (FIG. 2B).

A pair of scanning control counters 119a and 119b control the scanning of the relay matrices 115. A pair of jumpers 116 and 117 are shown to indicate options provided when the automatic call units of an embodiment of the present invention are equipped for either dial pulse or DTMF dialing. Jumpers 116 and 117 are as shown in FIG. 3 in the embodiment shown for DTMF dialing, and indicate that all eight trunks scanned by matrices 115a and 115b are scanned sequentially. Jumpers 116 and 117 are disconnected and a jumper shown in phantom as 118 is connected when dial pulse outputs are used. Under these conditions each matrix 115 independently scans four of outgoing trunk interface circuits 16.

A level conversion block shown as 120 is used to drive the relays of matrices 115 and to provide sufficient drive on bus 27 to OGT connector block 25 which eventually provides these signals to outgoing trunk interface circuit 16. Buses 32a and 32b are shown in FIG. 3 and correspond to the same buses shown in FIG. 1, which are used to signal automatic call units 30 when the concentrator has seized a trunk and is preparing to dial.

Turning next to FIG. 4A, the preferred embodiment of the automatic call unit for DTMF dialing is shown. Bus 32a shown on the righthand side of FIG. 4A may be seen to be comprised of lines 121, 122, and 125. Lines 121 and 122 are connected through the scanning matrices 115 of a concentrator (FIG. 3) onto the tip and ring circuits which appear as lines 55' and 56' (FIG. 3).

A timing control circuit 126 responds to signals from I/O controller 36 and control bus 39 to use the automatic call unit to control the dialing of trunks in the PBX. Two lines from control bus 39, as well as four line bus 33a, are connected to timing control unit through control bus interface circuit 127. Seizure control block 128 provides signal on line 125 to the concentrator, indicating that microcomputer 37 has requested a line for making a call. When the previously described connections through the concentrator of FIG. 3 and the outgoing trunk interface circuits of FIGS. 2A and 2B have been made, the next signal received by the automatic call unit is a dial tone which appears across lines 121 and 122. This is detected by dial tone detector 128 which provides a signal along line 129 to digit request circuit 130, which in turn provides a signal to control bus 39 indicating that a dial tone has been received and the automatic call unit is connected to an outgoing trunk and ready to dial a call into the PBX.

Microcomputer 37 responds by providing signals to interface circuit 127 which are decoded to control timing control circuit 126 to generate DTMF dial digitals, according to the row and column signals present on line 131 to DTMF generator 132. DTMF generator then provides the appropriate dual tone signals between lines 121 and 122 which are connected through one of outgoing trunk interface circuits 16 to the PBX to effect the call.

When this has been accomplished, timing control circuit 126 signals back to microcomputer circuit 37 that dialing has been complete and the automatic call unit is available to place another call.

As has been described hereinbefore, response to an answer of the call and cut through to message announcer 18 (FIG. 1) is under control of the outgoing trunk interface circuit 16 to which the ACU was previously connected, once the last digit has been generated by DTMF generator 132 and the ACU has signaled the computer that dialing is complete.

In FIG. 4B, a schematic diagram of the preferred embodiment of automatic call unit shown in FIG. 4A is shown. Lines 121, 122 and 125 are as shown in FIG. 4A. Lines 33a on the lefthand side of FIG. 4B carry four bit binary representations of digits to be dialed, including * and # (which are represented by binary equivalents of ten and eleven) of a conventional 4×3 telephone key pad. Lines 33a are provided to an array of optoisolators 155. A pair of input lines from microcomputer 37 are shown as 156 and 157.

An outgoing line to microcomputer 37 is designated 160. Line 156 also controls the signaling on line 158 which drives buffer 159, the output of which is connected to line 125. As noted hereinabove, line 125 is used to signal the outgoing trunk interface circuit that an automatic call unit is requesting seizure of a PBX trunk. Thus, line 156 will go low during the time the automatic call unit of FIG. 4B is connected to a seize trunk.

Line 157 is a data present signal line from microcomputer 37 indicating to the automatic call unit that valid data representing a digit to be dialed is present on bus 33a. Line 160 is a next digit line, indicating to microcomputer 37 that the previously present digit has been dialed and it is ready to accept and dial another digit. Thus, it will be generated that microcomputer 37 and the automatic call unit of FIG. 4B handshake on lines 157 and 160.

The outputs from optoisolators 155 which are connected to bus 33a appear on bus 33a' as the inputs to a four bit binary to one of sixteen decoder 161.

The lowest order 12 outputs from decoder 161 appear on bus 162 as the control inputs to three analog switches 165a–165c. In the preferred embodiment, analog switches 165 comprise type CD4016A CMOS analog switches currently manufactured by RCA. All inputs of each analog switches 165 are tied together and connected to one of the column inputs of row column to dual tone generator 132. Thus, it may be seen that the column one input to generator 132 is connected by line 166 to all of the inputs of analog switch 165a. Similarly, column two input of generator 132 is connected by line 167 to all inputs of switch 165b. As is shown, the column three input to generator 132 is similarly connected to 165c.

The four outputs of each analog switch 165 are connected to a common bus 170, tying them to the row inputs of generator 132. From inspection of this arrangement it will be appreciated that a dual tone output corresponding to the binary digit present on bus 33a' will appear on line 172. Since one and only one of the lines of bus 162 will be active, one and only one of the control inputs of analog switches 165a–165c will be active at any given time. The particular control input which is active will tie the column input of generator 162 corresponding to the column of the digit to the row input of the generator corresponding to the row of the digit, and thus the appropriate pair of frequencies will appear on line 172. In the preferred embodiment, generator 162 is embodied by a type MK5087 row column to dual tone encoder currently manufactured by Mostek.

The duel tone outputs on line 172 appear as signals across resistor 175 and thus between lines 121 and 122, as described hereinbefore. Consider for a moment the sequence of operation of the automatic call unit. When microcomputer 37 (FIG. 1) detects that line 160 is low (that is, tied to the computer circuit ground shown at 176) and the computer ascertains it is not presently using the automatic call unit shown in a dialing sequence, it determines that the unit is available for seizure. Microcomputer 37 will then take line 156 low, indicating that it wishes to seize the trunk connected to the ACU through one of the concentrators shown in FIG. 3. This provides the aforementioned signal on line 125 to the outgoing trunk circuit. Next the microcomputer will take line 157 low while presenting a number on bus 33a which will not activate any of the lines of bus 162. Taking line 157 low provides a logical one on line 177. resetting digit request flip-flop 178. At this point, microcomputer 37 waits for line 160 to go low, indicating that a dial tone has been received.

The incoming signal on line 121 is coupled to a pair of dial tone filters shown as 179, the output of which appears at point 180. It will be understood that dial tone filters 179 are high Q notch filters having center frequencies of 350 and 440 hertz in order to detect this tone combination, the standard dial tone. When a dial tone of sufficient magnitude is detected, the signals are passed through to point 180 and rectified and filtered by network 181, the output of which activates Schmitt trigger inverter 182. Inverter 182 provides a pulse at point 185 which triggers one shot 186, placing a zero on line 187. The transition of point 185, after being damped by RC network 188, is also passsed onto line 189 as the other input to NAND gate 190.

In the preferred embodiment, one shot 186 has a period of approximately one second. Thus, dial tone detector 128 shown in FIG. 4B requires approximately one second of valid dial tone before providing a negative going output on line 129 activating NAND gate 191. The activation of NAND gate 191 provides a positive going transition on line 192 clocking flip-flop 178 which sets same. The setting of flip-flop 178 takes line 160 low, signaling microcomputer 37 (FIG. 1) that the dial tone has been detected and the ACU is ready to receive digits to be dialed.

Thereafter, the following sequence occurs. A binary representation of a digit to be dialed is placed on bus 33a and thus appears on bus 33a'. Microcomputer 37 takes line 157 low indicating that valid data is present. Thus, both inputs to NAND gate 195 will be high, causing negative edge triggered one shots 196 and 197 of timing control circuitry 126 to be fired. In the preferred embodiment, one shot 196 has a period of approximately 70 milliseconds and one shot 197 has a period of approximately 140 milliseconds.

Thus, for the first half of the 140 millisecond period after triggering of one shots 196 and 197, line 198 will be low, deactivating the inhibit input of decoder 161, thus activating one line of bus 162 and causing a dual tone signal to be outputed as described hereinabove. When one shot 196 times out, decoder 126 is again inhibited, preventing the generation of any digits.

During the remainder of the period of one shot 197 (approximately 70 milliseconds), line 199 will be high and no outpulsing will take place. Thus it will be appreciated that the ACU of the preferred embodiment provides a sequence of approximately 70 milliseconds signaling interspersed with 70 milliseconds of silence. When one shot 197 times out, line 199 goes low causing a negative going pulse to activate NAND gate 191, which once again clocks digit request flip-flop 178 signaling microcomputer 37 (FIG. 1) along line 160 that the automatic call unit is ready to receive the next digit. The above noted sequence is then repeated.

Note that during the presence of data to be encoded as dual tone signals on bus 33a, the logical one level on line 199 is transmitted through line 193 to the base of transistor 194, saturating same, which ties point 180 to ground, shorting the output of dial tone filters 179. This arrangement assures that no spurious outputs at point 180 will be interpreted as dial tones by the arrangement, allowing for the inadvertent activation of NAND gate 190 which would set digit request flip-flop 178. If this were not provided, it is possible that one shot 186 could be triggered by a spurious signal and that later in the dialing sequence a second spurious signal could appear on line 189, thus causing both inputs to NAND gate 190 to be one, generating the spurious setting of flip-flop 178.

Turning next to FIG. 5, the structure of microcomputer 37 may be seen.

The microcomputer shown in FIG. 5 using the preferred embodiment is a single board eight bit microcomputer including sixteen kilobytes of electrically programmable read only memory 138 and sixteen kilobytes of random access memory 139. A central processor 137 controls the computer and is preferably a Z-80 CPU currently manufactured by Zilog, Inc. of Cupertino, California. Data and address bus 38 shown in FIG. 1 is shown as sixteen bit address bus 38a and eight bit data bus 38b in FIG. 5.

These buses are provided with sufficient drive by buffers 135, 136, 148 and 149 on the computer board. Also, control bus 39 of FIG. 1 is shown as broken down to three substituent components, control bus 39a and buses 39b and 39c from parallel input/output circuit 145. A USART 142 interfaces the computer via a four line serial data link shown as 146 and 147 in FIG. 5. This data link is provided to audit trail printer 144 (FIG. 1).

Counter timer circuit 140 together with input/output decoder 141 control the sequence and priority of servicing of various functions of the system.

It should also be understood that RS-232 ports are connected to the data link comprising lines 146 and 147 for connection to an external printer.

In the preferred embodiment, the CRT terminals and printers communicating with USART 142 generate interrupts when service is required. Also, an interrupt is generated on a tap on a sixty hertz AC line signal for a real time clock implemented in software.

The remaining functions described heretofore are accomplished in a predetermined sequence during each pass through the program stored in ROM 138.

It should be understood that when a message is received by an operator at one of CRT consoles 141 (FIG. 1) indicating, for example, that a specific room number corresponding to a specific PBX subscriber line desires to be awakened at a given time of day, a keyboard entry will be made at the CRT console. As data from the CRT 41 comes in on data bus 38b, a signal is provided to counter timer 140 indicating that received data is coming in on the bus. Counter timer 140 generates an interrupt request which will be serviced by the CPU to store in random access memory 139 the information coming in on bus 386 as to room number and time of day to be called.

Audit trail printer 144 (FIG. 1) is used to provide a log of all calls made in a given time period, the number of calls which are not completed in a predetermined number of attempts, and furthermore will provide indications of the amount of traffic through each of the outgoing trunks connected to the outgoing trunk connectors. The last-mentioned data is quite useful for alerting the operator of the system to a malfunction in any particular one of the trunks.

Furthermore, in response to an audit trail request from one of CRT terminals 41, the existence of an alarm condition indicating an overflow of calls from the acceptable time deviation as described hereinbelow will be printed. Furthermore, the software of the preferred embodiment provides control signals responsive to input from one of CRT terminals 41 to select a particular path through a particular one of automatic call units and outgoing trunk connectors, as well as a particular outgoing trunk, in order that any given signal path may be tested. This is useful in diagnosing problems within the PBX and the preferred embodiment shown herein.

Data is entered at CRT terminals 41 in the form of data pairs, one element of each pair being an extension signal corresponding to the room to be dialed, with the other element being a time signal indicative of the time of day the announcement is to be delivered to that extension.

As RAM 139 accumulates a list of rooms to be called at particular times of day, each pass through the program analyzes the traffic load at particular times of day to ascertain if any potential backlog may develop. Consider for example that forty rooms have requested to be awakened at 8:00 in the morning. As this information accumulates in random access memory 139, CPU 137 under the control of read only memory 138 will detect an excess of calls to be made at the particular 8:00 AM time. The preferred embodiment treats 8:00 AM as the one minute time slot immediately following 8:00:00 in the real time clock in software.

Acceptable deviations from the time requested may be entered into a register of random access memory 139 from one of CRT consoles 41 (FIG. 1). If CPU 137 detects that forty calls cannot be made within the selected deviation, an alarm condition exists. When this occurs, a data signal is generated which passes out over link 147 to a printer and/or one of CRTs 41, indicating that an alarm condition exists in response to an audit request. For example, if a signal has been entered from one of CRTs 41 indicating that plus or minus three minutes is an acceptable deviation, and the load of calls to be made at 8:00 AM is one that the system determines cannot all be made within six minutes, the alarm condition will exist.

Furthermore, if all the calls may be accomplished within the predetermined deviation, the program in ROM 138 causes the placement of these calls to be made symmetrically about the requested time slot. Thus, if all calls may be made in a three minute time span, calling of all the 8:00 AM calls will begin at the 7:59 AM slot and proceed through the 8:01 AM time slot. Substantially half the calls which cannot be made in the 8:00 AM time slot will be made prior to 8:00 AM, with the remainder being made in the 8:01 time slot.

Thus it will be appreciated that the preferred embodiment provides a storage means for storing a plurality of the aforementioned data pairs in random access memory 139. Furthermore, the apparatus of FIG. 5 provides a scanning means for scanning the data pairs stored in RAM 139 and for counting the number N of data pairs characterized by a common time signal T. Thus in the example just set forth, N will be equal to 40 and common time signal T will be a representation corresponding to 8:00 AM. Therefore, if L is the number of calls that can be made in the time slot corresponding to time signal T, it will be appreciated that substantially (N-L)/2 calls will be made prior to the T time slot and the same number after the T time slot.

The device further provides a distribution means for providing extension signals to the automatic call unit of FIG. 4B for substantially N minus L over 2 of the data pairs prior to the 8:00 AM slot and the remainder after the 8:00 AM slot.

It will further be appreciated that if N number of data pairs characterized by a common time signal T are stored in random access memory 39, that the preferred embodiment provides an arrangement which places substantially N over 2 (20 in the example) of the extension signals out to the automatic call units prior to the occurrence of a mid-point of the time slot corresponding to time signal T. The remaining N over 2 calls will be placed after the occurrence of the mid-point in this time slot corresponding to time signal T.

It will further be appreciated that the provision of an alarm condition when an unacceptable deviation from the requested time will be required is accomplished by an alarm means responsive to the aforementioned scanning means which provides an alarm output signal. A storage location of read only memory 138 contains a signal M corresponding to the average time required for each call. The alarm condition is provided when there are N data pairs characterized by a common time signal for which N times M exceeds 2 times D, where D is the above-mentioned acceptable deviation. Thus it will be appreciated that when the number of calls to be made at a particular time times the average time required per call exceeds the length of the time slot defined by the chosen time plus or minus deviation D, the alarm condition is generated. The alarm condition will be reported in response to an audit request on printer 144.

A time-to-second-call signal may also be entered from one of CRT consoles 41. For example, assume that the operator has selected seven minutes as the time to second call. In this instance, the computer circuit shown in FIG. 5 will detect through I/O controller 36 the failure of any call to be completed within a predetermined amount of time after dialing is completed by the ACU which placed the call. When the call is not answered within a predetermined time, the outgoing trunk interface circuit is disconnected by grounding line 97 (FIG. 2B) and the particular outgoing trunk interface circuit is selected to place another call. Information is stored in random access memory 139 indicating that a call was placed and not completed. Under these circumstances, CPU 137 will treat this information as a request to place a second call to the same room seven minutes later. This information will be placed into the list in random access memory 139 to be included in the list of calls which must be analyzed to determine the placement time deviation as described hereinabove.

Thus, if the occupant of a hotel room, for example, was indisposed at the time the first call was made, there is a good chance the second call will be answered.

In the event that the second call is not answered when made seven minutes later, the CPU provides signals to data bus 386 which are passed out to one of CRT terminals 41 and to printer 144 along outgoing communication link 147, indicating that the particular room has been called twice and no answer has been made. This allows personnel at the hotel to personally visit the called room to ascertain if anything is amiss.

It should be understood that while the preferred embodiment has selected two attempts to call the room prior to generation of this alarm condition, embodiments of the present invention may be constructed using any predetermined number of attempts to complete a call prior to generation of the alarm condition.

The block calling feature of the present invention allows all extensions lying between (and including) a pair of specified extension numbers to be dialed and have the predetermined message delivered. To effect this feature, an operator at one of CRT terminals 41 enters a code indicating a block call is to be defined, followed by a pair of room numbers (or extension numbers) defining the block of rooms to be called. This information is transmitted along one of data links 142 and passes through USART 142 and is stored in random access memory 139.

The notation of the time of day at which this is to commence is entered in the sequential time list of random access memory 139 and upon the real time clock reaching this time of day, calling of all extensions in the defined block commences.

In the preferred embodiment this calling takes place sequentially beginning at the lowest extension number and proceeding toward the highest, but of course any sequence is acceptable.

It should therefore be understood that the data provided from CRT terminals 41 to implement the block calling feature is provided in the form of a data pair comprising a pair of distinct extension signals defining the block of room numbers to be called. These signals are stored in random access memory 139.

CPU 137 serves as a control means which, upon detection of a block call control signal from terminal 41, sequentially provides a plurality of dialing signals to trunks 15 for delivering the predetermined message from announcer 18 to each of the extensions which is characterized by an extension signal lying between the aforementioned pair of distinct extension signals in the data pair which defines the block.

From the foregoing description of the preferred embodiment it will be appreciated that the present invention accomplishes the objects set forth hereinabove. Given the disclosure of the preferred embodiment, other embodiments will suggest themselves to those skilled in the art. Therefore the scope of the present invention is to be limited only by the claims below.

We claim:

1. In an automatic call placement system for delivering predetermined messages to a plurality of extensions on a telephone exchange including a real time clock for providing a time of day signal, selectively operable input means for entering a plurality of data pairs, each comprising an extension signal and a time signal corresponding to a predetermined time of day, storage means for storing said plurality of said data pairs, a processor, a data bus connecting said processor and a dialing and connection means for providing dialing signals to a trunk connected to said exchange in response to said extension signals present on said data bus; the improvement comprising:

scanning means for scanning data pairs stored in said storage means and for counting a number N of said data pairs characterized by common time signals T; and distribution means responsive to said real time clock and said scanning means for providing said extension signals for substantially N/2 of said N data pairs to said dialing and connection means prior to occurrence of a midpoint of a time slot corresponding to a time of day signal T from said real time clock and for providing said extension signals for the remainder of said N data pairs to said dialing and connection means subsequent to said occurrence of said mid-point from said real time clock.

2. The improvement of claim 1 further comprising deviation means for establishing a predetermined time deviation signal D corresponding to an increment of time;

means for providing a signal M corresponding to an average time required for each call; and an alarm means responsive to said scanning means and said deviation means for providing an alarm condition signal upon each occurrence of any N of said data pairs characterized by said common time signals for which N×M exceeds 2×D.

3. The improvement of claim 2 wherein said deviation means includes said input means and said deviation signal D is selectively variable.

4. In an automatic call placement system for delivering predetermined messages to a plurality of extensions on a telephone exchange including a real time clock for providing a time of day signal, selectively operable input means for entering a plurality of data pairs, each comprising an extension signal and a time signal corresponding to a predetermined time of day, storage means for storing said plurality of said data pairs, a processor, a data bus connecting said processor and a dialing and connection means for providing dialing signals to a trunk connected to said exchange in response to said extension signals present on said data bus, said automatic call placement system being characterized by a capability of delivering L messages within a predetermined time slot corresponding to a particular time signal T; the improvement comprising:

scanning means for scanning data pairs stored in said storage means and for counting a number N of said data pairs characterized by common time signals T; and distribution means responsive to said real time clock and said scanning means for providing said extension signals for substantially $N-L/2$ of said N data pairs to said dialing and connecting means prior to occurrence of said time slot corresponding to said time of day signal T from said real time clock, for providing L of said N data pairs to said dialing and connection means during said time slot, and for providing the remainder of said N data pairs to said dialing and connecting means subsequent to the occurrence of said time slot from said real time clock.

5. In an automatic call placement system for delivering a predetermined message to a plurality of extensions on a telephone exchange including a real time clock for providing a time of day signal, selectively operable input means for entering a data pair comprising an extension signal and a time signal corresponding to a predetermined time of day, storage means for storing a plurality of said data pairs, a processor, a data bus connecting said processor and a dialing and connection means for providing dialing signals to a trunk connected to said exchange in response to said extension signals present on said data bus, said dialing and connection means further comprising outgoing trunk interface means responsive to supervisory signals on said trunk to provide an answer signal in response to detection of a predetermined supervisory signal on said trunk; the improvement comprising:

timing means for providing a no-answer signal upon detection of the absence of said answer signal within a predetermined time of completion of said dialing signals corresponding to a first one of said data pairs comprising a first extension signal and a first time signal; and repeating means responsive to said timing means for generating and storing in said storage means a second data pair comprising said first extension signal and a second time signal differing from said first time signal by a predetermined offset.

6. In an automatic call placement system for delivering a predetermined message to a plurality of extensions on the telephone exchange, each of said extensions corresponding to a unique one of a plurality of extension signals, said automatic call placement system including announcement reproducing apparatus providing electrical signals embodying said predetermined message, a selectively operable input means for entering a data pair comprising a pair of distinct ones of said plurality of said extension signals, and for entering a predetermined block call signal; storage means for storing said data pair; a processor; a data bus connecting said processor, and a dialing and connection means for seizing one of a plurality of trunks connected to said exchange and for providing a distinct one of a plurality of sets of dialing signals to said one of a plurality of trunks in response to each of said plurality of extension signals present on said data bus; the improvement comprising:

control means connected to and responsive to said storage means and said input means for controlling said dialing and connection means to sequentially provide each of a subset of said plurality of extension signals lying between said pair of distinct extension signals which comprise said data pair, and subsequently to connect said announcement reproducing apparatus to each of said plurality of trunks which was seized by said dialing and connection means in response to each extension signal of said subset of said plurality of extension signals, in response to said block call signal from said input means;

whereby said predetermined message is sequentially delivered to each of said plurality of extensions which corresponds to each extension signal in said subset of said plurality of extension signals.

* * * * *